United States Patent
Balakrishnan et al.

(10) Patent No.: US 11,737,478 B2
(45) Date of Patent: Aug. 29, 2023

(54) MEAT ALTERNATIVE COMPOSITIONS COMPRISING CRANBERRY SEED PREPARATIONS AND METHODS FOR MAKING SAME

(71) Applicant: Ocean Spray Cranberries, Inc., Lakeville-Middleboro, MA (US)

(72) Inventors: Gayathri Balakrishnan, Shaker Heights, OH (US); Mariccor Batoy, Lakeville-Middleboro, MA (US); David John Ehrlinger, Lakeville-Middleboro, MA (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 160 days.

(21) Appl. No.: 17/067,533

(22) Filed: Oct. 9, 2020

(65) Prior Publication Data

US 2021/0274808 A1    Sep. 9, 2021

Related U.S. Application Data (60) Provisional application No. 62/913,095, filed on Oct. 9, 2019.

(51) Int. Cl.
| | |
|---|---|
| *A23J 3/14* | (2006.01) |
| *A23J 3/22* | (2006.01) |
| *A23L 25/00* | (2016.01) |
| *A23L 11/00* | (2021.01) |

(52) U.S. Cl.
CPC .............. *A23J 3/227* (2013.01); *A23J 3/14* (2013.01); *A23L 11/05* (2016.08); *A23L 25/30* (2016.08); *A23V 2002/00* (2013.01)

(58) Field of Classification Search
CPC ... A23J 3/227; A23J 3/14; A23L 25/30; A23L 11/05; A23V 2002/00
USPC ........................................................ 426/656
See application file for complete search history.

(56) References Cited

U.S. PATENT DOCUMENTS

| | | | |
|---|---|---|---|
| 6,391,345 B1 * | 5/2002 | Heeg .................... | A61K 8/9789 424/732 |
| 2005/0220979 A1 | 10/2005 | Baumer et al. | |
| 2009/0208612 A1 | 8/2009 | Reiser et al. | |
| 2012/0171351 A1 | 7/2012 | Solorio | |
| 2017/0105438 A1 * | 4/2017 | Ajami .................... | A23L 33/17 |
| 2017/0258109 A1 | 9/2017 | Redl et al. | |

OTHER PUBLICATIONS

PCT International Preliminary Report on Patentability in International Appln. No. PCT/US2020/055145, dated Apr. 12, 2022, 11 pages.
PCT International Search Report and Written Opinion in International Appln. No. PCT/US2020/055145, dated Feb. 17, 2021, 14 pages.

* cited by examiner

*Primary Examiner* — Hamid R Badr
(74) *Attorney, Agent, or Firm* — Fish & Richardson P.C.

(57) ABSTRACT

This disclosure relates for example to meat alternative compositions comprising a plant based meat alternative and a cranberry seed preparation. This disclosure is also related to methods of preparing such meat alternative compositions.

21 Claims, 2 Drawing Sheets
(2 of 2 Drawing Sheet(s) Filed in Color)

MEAT ALTERNATIVE COMPOSITIONS COMPRISING CRANBERRY SEED PREPARATIONS AND METHODS FOR MAKING SAME

CROSS SECTION TO RELATED APPLICATIONS

The present application claims priority to U.S. Provisional Application No. 62/913,095, filed on Oct. 9, 2019, the disclosure of which is expressly incorporated herein in entirety by reference thereto.

TECHNICAL FIELD

The present disclosure provides, inter alia, meat alternatives that include cranberry seed preparations and methods of preparing such meat alternative compositions.

BACKGROUND

A meat alternative, also known as, among others, a meat analog, meat substitute, mock meat, faux meat, imitation meat, vegetarian meat, or vegan meat, imitates taste, aesthetic qualities, and/or chemical characteristics of animal-derived meat. Specifically, meat alternatives are comprised of materials other than animal-derived meat, such as plant-derived materials, and imitate texture, flavor, appearance, and/or odor of a specific type of meat, e.g., beef, venison, pork, etc.

Typical meat alternatives are made from plant-based ingredients, for example, soy (e.g. tofu, tempeh) gluten, peas, rice, legumes, and/or mushrooms. Food additives are typically added to the meat alternative to prolong shelf life and imitate qualities of meat, such as taste, smell or appearance. Additives include flavor compounds, coloring agents, leavening agents, and emulsifiers. With the growing popularity of meat alternatives, there is a need for natural ingredients that can improve their characteristics and further appeal to consumers.

SUMMARY

The present invention is based, at least in part, on the discovery that cranberry seed preparations can be included in a meat alternative to, for example, improve the composition's appearance before and after cooking and increase protein and/or fiber content of the composition. In particular, a meat alternative composition containing a cranberry seed preparation transforms from pink or red to brown when thermal energy is applied. This color change has an appearance similar to that the change that occurs in animal-derived meat, i.e., due to the blood content of the animal-derived meat. Adding a cranberry seed preparation to the meat alternative therefore provides a natural colorant that imitates the coloring of meat before and after cooking, with relatively little effect on the meat alternative taste. Further, cranberry seed preparations may provide an increased level of protein and/or fiber without heavily influencing taste or texture of the meat alternative.

As used herein, "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

In certain aspects, a meat alternative composition comprises a meat alternative and a cranberry seed preparation.

In some embodiments, the cranberry seed preparation is a granular, flaked, or powdered cranberry seed preparation In some embodiments, the meat alternative is a plant-based meat alternative. In some embodiments, the plant-based meat alternative is selected from the group consisting of legume-based meat alternative, rice-based meat alternative, soy based meat alternative, pea based meat alternative, gluten based meat alternative, quinoa based meat alternative, plant heme containing meat alternative, and mushroom based meat alternative.

In some embodiments, the meat alternative composition comprises the cranberry seed preparation at a concentration of about 1 mg/g to about 750 mg/g.

In some embodiments, the cranberry seed preparation has a protein content of about 20 grams to about 25 grams per 100 grams of cranberry seed preparation. Some cranberry seed preparations have a protein content of about 23 grams to about 24 grams per grams of cranberry preparation. In some embodiments, the protein content of the cranberry seed composition is 23.3 grams of protein per 100 grams of cranberry seed composition.

In some embodiments, the meat alternative composition is configured as a burger, a steak, sausage link, a fillet, a hot dog, a bratwurst, a sausage patty, ground sausage, ground beef, roast beef, peperoni, salami, prosciutto, a pork chop, bacon, ground chicken, or ground turkey.

In some embodiments, at least 40% of the protein content of the composition is provided by the cranberry seed preparation.

In certain aspects, a method of preparing a meat alternative composition, comprises providing a composition that comprises a meat alternative and a cranberry seed preparation. The method further comprises heating the composition under conditions sufficient to cause a color change in anthocyanins present in the cranberry seed preparation.

In certain aspects, a meat alternative composition comprises a cranberry seed preparation, vegetable broth, and ground chickpeas, wherein at least 40% of the protein content of the meat alternative composition is provided by the cranberry seed composition.

In some embodiments, the cranberry seed preparation is a cranberry seed powder. In some embodiments, the cranberry seed powder has an average particle size of at least 250 μm. In some embodiments, the cranberry seed powder has an average particle size of up to 750 μm.

Some cranberry seed preparations have an average particle size between about 1 mm and 0.5 μm, inclusive. Some cranberry seed preparations have an average particle size between about 0.8 millimeters (mm) and 0.9 mm, inclusive. Some cranberry seed preparations have an average particle size of 20 mesh. Some cranberry seed preparations have an average particle size between about 0.68 mm and 0.72 mm, inclusive. Some cranberry seed preparations have an average particle size of 25 mesh. Some cranberry seed preparations have an average particle size between about 0.58 mm and 0.62 mm, inclusive. Some cranberry seed preparations have an average particle size of 30 mesh. Some cranberry seed preparations have an average particle size between about 480 micrometers (μm) and 520 μm, inclusive. Some cranberry seed preparations have an average particle size of 35 mesh. Some cranberry seed preparations have an average particle size between about 400 μm and 440 μm, inclusive. Some cranberry seed preparations have an average particle size of 40 mesh. Some cranberry seed preparations have an average particle size between about 325 μm and 375 μm, inclusive. Some cranberry seed preparations have an average particle size of 45 mesh. Some cranberry seed preparations have an average particle size between about 280 μm and 320 μm, inclusive. Some cranberry seed preparations have an average particle size of 50 mesh. Some cranberry seed preparations have an average particle size between about 225 μm and 275 μm, inclusive. Some cranberry seed preparations have an average particle size of 60 mesh. Some cranberry seed preparations have an average particle size between about 200 μm and 220 μm, inclusive. Some cranberry seed preparations have an average particle size of 70 mesh. Some cranberry seed preparations have an average particle size between about 165 μm and 190 μm, inclusive. Some cranberry seed preparations have an average particle size 80 mesh. Some cranberry seed preparations have an average particle size between about 130 μm and 160 μm, inclusive. Some cranberry seed preparations have an average particle size of 100 mesh. Some cranberry seed preparations have an average particle size between about 115 μm and 130 μm, inclusive. Some cranberry seed preparations have an average particle size of about 177 μm. Some cranberry seed preparations have an average particle size between about 172 μm and 182 μm, inclusive. Some cranberry seed preparations have an average particle size between about 165 μm and 190 μm, inclusive. Some cranberry seed preparations have an average particle size between about 150 μm and 200 μm, inclusive. Some cranberry seed preparations have an average particle size of 120 mesh. Some cranberry seed preparations have an average particle size between about 95 μm and 110 μm, inclusive. Some cranberry seed preparations have an average particle size of 140 mesh. Some cranberry seed preparations have an average particle size between about 80 μm and 90 μm, inclusive. Some cranberry seed preparations have an average particle size of 170 mesh. Some cranberry seed preparations have an average particle size between about 70 μm and 80 μm, inclusive. Some cranberry seed preparations have an average particle size of 200 mesh. Some cranberry seed preparations have an average particle size between about 58 μm and 70 μm, inclusive. Some cranberry seed preparations have an average particle size of 230 mesh. Some cranberry seed preparations have an average particle size between about 48 μm and 58 μm, inclusive. Some cranberry seed preparations have an average particle size of 270 mesh. Some cranberry seed preparations have an average particle size between about 40 μm and 50 μm, inclusive. Some cranberry seed preparations have an average particle size of 325 mesh. Some cranberry seed preparations have an average particle size between about 15 μm and 40 μm, inclusive. Some cranberry seed preparations have an average particle size of 400 mesh. Some cranberry seed preparations have an average particle size between about 10 μm and 15 μm, inclusive. Some cranberry seed preparations have an average particle size between about 15 μm and 20 μm, inclusive. Some cranberry seed preparations have an average particle size between about 5 μm and 10 μm, inclusive. Some cranberry seed preparations have an average particle size between about 1 μm and 5 μm, inclusive.

In some embodiments, the meat alternative composition comprises about 5% to about 20% cranberry seed preparation. Some meat alternative compositions comprise about 10% to about 13% cranberry seed preparation by weight. Some meat alternative compositions comprise about 11% to about 12% cranberry seed preparation by weight. Some meat alternative compositions comprise about 11.86% cranberry seed preparation by weight. Some meat alternative compositions comprise about 1% to about 10% cranberry seed preparation by weight. Some meat alternative compositions comprise about 10% to about 30% cranberry seed preparation by weight. Some meat alternative compositions comprise about 10% to about 40% cranberry seed preparation by weight. Some meat alternative compositions comprise about 15% to about 25% cranberry seed preparation by weight. Some meat alternative compositions comprise about 10% to about 25% cranberry seed preparation by weight. Some meat alternative compositions comprise about 5% to about 8% cranberry seed preparation by weight. Some meat alternative compositions comprise about 10% to about 12% cranberry seed preparation by weight. Some meat alternative compositions comprise about 12% to about 15% cranberry seed preparation by weight.

In some embodiments, the cranberry seed preparation provides at least 40% of the protein content of the meat alternative composition. Some cranberry seed preparations provide at least 10% of the protein content of the meat alternative composition. Some cranberry seed preparations provide at least 15% of the protein content of the meat alternative composition. Some cranberry seed preparations provide at least 20% of the protein content of the meat alternative composition. Some cranberry seed preparations provide at least 25% of the protein content of the meat alternative composition. Some cranberry seed preparations provide at least 30% of the protein content of the meat alternative composition. Some cranberry seed preparations provide at least 35% of the protein content of the meat alternative composition. Some cranberry seed preparations provide at least 45% of the protein content of the meat alternative composition. Some cranberry seed preparations provide at least 50% of the protein content of the meat alternative composition. Some cranberry seed preparations provide at least 55% of the protein content of the meat alternative composition. Some cranberry seed preparations provide at least 60% of the protein content of the meat alternative composition. Some cranberry seed preparations provide at least 65% of the protein content of the meat alternative composition. Some cranberry seed preparations provide at least 70% of the protein content of the meat alternative composition. Some cranberry seed preparations provide at least 75% of the protein content of the meat alternative composition. Some cranberry seed preparations provide at least 80% of the protein content of the meat alternative composition.

In some embodiments, the meat alternative composition comprises a vegetable broth content of about 30% to about 40% by weight. Some meat alternative compositions comprise about 35% to about 36% vegetable broth by weight. Some meat alternative compositions comprise about 35.57% vegetable broth by weight.

In some embodiments, the meat alternative composition has a ground chickpea content of about 20% to about 25% by weight. Some meat alternative compositions comprise about 23% to about 24% ground chickpea by weight. Some meat alternative compositions comprise about 23.72% ground chickpea by weight.

In some embodiments, the meat alternative composition further comprises diced jack fruit. The meat alternative composition has a diced jack fruit content of about 5% to about 10% by weight. Some meat alternatives composition have a dice jackfruit content of about 7% to about 8% by weight. Some meat alternatives composition have a jack fruit content of about 7.91% by weight.

In some embodiments, the meat alternative composition comprises brown rice flour. The meat alternative composition has a brown rice flour content of about 1% to about 8% by weight. Some meat alternative compositions have a brown rice flour content of about 2% to about 5% by weight. Some meat alternative compositions have a brown rice flour content of about 3% to about 4% by weight. Some meat alternative compositions have a brown rice flour content of about 3.95% by weight.

In some embodiments, the meat alternative composition comprises tapioca flour. The meat alternative composition has a tapioca flour content of about 1% to about 8% by weight. Some meat alternative compositions have a tapioca flour content of about 2% to about 5% by weight. Some meat alternative compositions have a tapioca flour content of about 3% to about 4% by weight. Some meat alternative compositions have a tapioca flour content of about 3.95% by weight.

In some embodiments, the meat alternative composition comprises dried shitake mushroom. The meat alternative composition has a dried shitake mushroom content of about 1% to about 8% by weight. Some meat alternative compositions have a dried shitake mushroom content of about 2% to about 5% by weight. Some meat alternative compositions have a dried shitake mushroom content of about 3% to about 4% by weight. Some meat alternative compositions have a dried shitake mushroom content of about 3.95% by weight. In some embodiments, further comprising caramelized onion e.g., at about 1% to about 8% by weight, e.g., at about 3.95% by weight.

In some embodiments, the meat alternative composition comprises caramelized onion. The meat alternative composition has a caramelized onion content of about 1% to about 8% by weight. Some meat alternative compositions have a caramelized onion content of about 2% to about 5% by weight. Some meat alternative compositions have a caramelized onion content of about 3% to about 4% by weight. Some meat alternative compositions have a caramelized onion content of about 3.95% by weight. In some embodiments, further comprising caramelized onion e.g., at about 1% to about 8% by weight, e.g., at about 3.95% by weight.

In some embodiments, the meat alternative composition comprises a seasoning blend. The meat alternative composition has a seasoning blend content of about 0.5% to about 7% by weight. Some meat alternative compositions have a seasoning blend content of about 2% to about 5% by weight. Some meat alternative compositions have a seasoning blend content of about 3% to about 4% by weight. Some meat alternative compositions have a seasoning blend content of about 3.16% by weight. In some embodiments, further comprising caramelized In some embodiments, the meat alternative composition comprises coconut oil. The meat alternative composition or meat alternative has a coconut oil content of about 0.5% to about 6% by weight. Some meat alternative compositions or meat alternatives have a coconut oil content of about 0.75% to about 5% by weight. Some meat alternative compositions or meat alternatives have a coconut oil content of about 1% to about 2% by weight. Some meat alternative compositions or meat alternatives have a coconut oil content of about 1.98% by weight. In some embodiments, further comprising caramelized onions.

In certain aspects, a method of preparing a meat alternative composition, includes providing a meat alternative, and adding a cranberry seed preparation to the meat alternative to thereby make a meat alternative composition, wherein the cranberry seed preparation is added to the meat alternative in amounts sufficient to constitute 5% of the meat alternative composition by weight.

In some embodiments, the meat alternative composition comprises a plant based-based protein source, a binder, and a fat source. In some embodiments, the plant-based protein source is selected from the group consisting of soy bean protein concentrate, pea protein isolate, rice protein, chickpeas, lentils, *spirulina, quinoa*, mycoprotein, chia seeds, hemp seeds, and brown rice flour.

The present specification provides, e.g., a meat alternative composition comprising a plant based meat alternative. The plant-based meet alternative can be, e.g., a non-heme-comprising meat alternative. The plant based meat alternative can include at least a binder, e.g., at about 0.1% to about 14% (e.g., about 0.1% to about 2%, or about 0.1% to about 3%) dry weight of the total meat alternative composition, and a fat source, e.g., at about 0.1% to about 25% (e.g., about 0.1% to about 5%, about 8% to about 15%, about 7% to about 25%, about 9% to about 16%, or about 7% to about 14%) dry weight of the total meat alternative composition. The meat alternative further includes a cranberry seed preparation, e.g., at about 4% to about 42% dry weight of the total meat alternative composition, or about 6% to about 28%, or about 2% to about 30%, or about 5% to about 18% or about 5% to about 15%, of the dry weight of the total meat composition. The meat alternative composition can be configured to resemble any edible composition, such as beef, pork, sausage, lamb, bison, veal, peperoni, chicken, or turkey.

The plant based meat alternative can be any plant based meat alternative known in the art (e.g., a commercially available plant based meat alternative), and may be, e.g., a legume based meat alternative, a rice based meat alternative, a soy based meat alternative, a pea based meat alternative, a gluten based meat alternative, a mushroom based meat alternative, or any combination thereof.

The cranberry seed preparation may include a cranberry seed powder, for example, having an average particle size of about 20 mesh to about 100 mesh, e.g., about 30 to about 90 mesh, about 40 to about 90 mesh, about 50 to about 90 mesh, about 70 to about 90 mesh, or about 80 mesh. In some instances, the cranberry seed powder can have an average particle size of about 125 μm to about 225 μm, e.g., about 140 μm to about 220 μm, about 170 μm to about 180 μm, or about 177 μm.

The cranberry seed preparation may include a cranberry protein isolate. Where the cranberry seed preparation includes both a cranberry seed powder and a cranberry protein isolate, the cranberry seed powder and cranberry protein isolate may for example be present in a ratio, such as between 4:3 and 4:23, inclusive. In some instances, at least 40% of the protein present in the meat alternative composition is provided by the cranberry seed preparation The meat alternative composition may include a plant based protein source (such as a pea protein isolate), e.g., at about 0.1% to about 25%, about 0.1% to about 12%, about 0.1% to about 7%, or about 0.1% to about 9% dry weight of the total meat alternative composition.

The fat source of the meat alternative can be any art-known consumable fat source. Exemplary fat sources include coconut oil, avocado oil, palm oil, olive oil, corn oil, canola oil, or any combination of such oils.

The present specification also provides, e.g., methods of preparing a meat alternative composition. The methods can include providing the meat alternative composition described herein, and heating the meat alternative composition under conditions sufficient to cause a color change in anthocyanins present in the cranberry seed preparation. In some instances, the method includes providing a meat alternative and adding a cranberry seed preparation to the meat alternative (e.g., by mixing), or providing a cranberry seed preparation and adding a meat alternative to the cranberry seed preparation (e.g., by mixing). In some instances, the method further includes forming the meat alternative composition into a patty or other useful shape, e.g., prior to heating the meat alternative composition.

The present specification also provides, e.g., methods of preparing a meat alternative composition that include providing a meat alternative, and adding a cranberry seed preparation (e.g., comprising a cranberry seed powder) to the meat alternative, to thereby make a meat alternative composition. In some instances, the cranberry seed preparation is added to the meat alternative (e.g., by mixing the cranberry seed preparation into the meat alternative) in amounts sufficient to constitute at least 5% of the meat alternative composition by weight. The methods can further include, e.g., shaping the meat alternative composition into a patty or other useful shape, and/or applying thermal energy to the meat alternative composition to induce a color change of the meat alternative composition.

The present specification also provides compositions that can be made from a meat alternative composition. Examples of such compositions are jerky compositions, which can include, e.g., a dehydrated meat alternative composition and a cranberry seed preparation. The cranberry seed preparation can be, e.g., at about 9% to about 25% by weight of the total jerky composition. In some instances, the cranberry seed preparation comprises cranberry seed powder, a cranberry protein isolate, or both a cranberry seed powder and a cranberry protein isolate. For example, the cranberry seed preparation can include cranberry seed powder at about 4% to about 20% by weight of the total jerky composition, and/or cranberry protein isolate at about 5% to about 25% by weight of the total jerky composition. The meat alternative jerky composition can further include other ingredients, such as cane sugar, soy sauce, yeast extract, onion powder, garlic powder, spices, white vinegar, salt, natural flavor, and/or canola oil. The jerky composition can be included in other products, such as trail mixes. In addition to the jerky composition, such trail mixes can further include, e.g., walnuts, cashews, almonds, cranberries, plum pieces, pear pieces, apple pieces, cranberry seeds, peach pieces, coconut flakes, chocolate pieces, ginger pieces, and/or pecan pieces.

Unless otherwise defined, all technical terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

The present disclosure describes, among other things, meat alternative compositions comprising a cranberry seed preparation (e.g., a cranberry seed powder). Meat alternative compositions described herein can be comprised of a single or a mixture of plant-based ingredients, cranberry seed preparation (e.g., cranberry seed powder), and optionally other filler ingredients. The inclusion of a cranberry seed preparation to a meat alternative can provide a pink coloring to the meat alternative composition, similar to that raw meat. When heated, the cranberry seed preparation browns, due to the anthocyanin content of cranberry seeds, thereby giving the meat alternative composition a cooked meat aesthetic without the use of additional artificial colorants. Alternatively or in addition, inclusion of a cranberry seed preparation to a meat alternative can increase the protein and/or fiber content of the composition. A cranberry seed preparation can provide a cleaner ingredient line as it can provide protein and/or fiber as well as replace ingredients that are only added to provide color in meat alternative compositions.

The disclosure refers, for example, to meat alternatives that imitate ground meats, in particular ground beef or sausage, however skilled practitioners will readily appreciate that other meat alternatives are within the scope of the invention. For example, a cranberry seed preparation may be added to meat alternatives that imitate poultry, pork, shell fish, fish and other seafood, venison, veal, buffalo, bison, lamb, rabbit, or alligator. Skilled practitioners will also appreciate that meat alternative compositions described herein can be configured to approximate any animal-derived meat product, such as a burger, a steak, sausage link, a fillet, a hot dog, a bratwurst, a sausage patty, pulled pork, shredded chicken, ground sausage, ground beef, roast beef, peperoni, salami, prosciutto, a chicken breast, a chicken thigh, a chicken wing, turkey breast, a pork chop, a lamb shank, bacon, ground chicken, or ground turkey, jerkies among many others.

In some instances, a cranberry seed preparation can be added to animal-derived meats to add or enhance pink coloring and/or increase the protein content of the animal-derived meats. Exemplary of such animal-derived meats are beef (e.g., ground beef, beef jerky), poultry, pork, shellfish, fish and other seafood, venison, veal, buffalo, bison, lamb, rabbit, or alligator, among others.

Meat Alternatives

As used herein, the term "animal-derived meat" means an edible product that comprises animal flesh (e.g., animal muscle). As used herein, the term "meat alternative" means an edible food product that comprises at least one plant-derived ingredient (e.g., comprises only plant-derived ingredients) and that at least approximates the taste and/or appearance of an animal-derived meat, but does not comprise animal-derived meat. For example, a meat alternative may comprise at least 2, e.g., 3, 4, 5, 6, 7, 8, 9 or at least 10, plant-derived ingredients, or may consist only of plant-derived ingredient(s). As used herein, the term "meat alternative composition" means a meat alternative that comprises a cranberry seed preparation described herein.

A meat alternative (e.g., a plant-based meat alternative) can be produced by any method known in the art. An exemplary list of ingredients will be described herein. The meat alternative can include a protein source (such as a plant-based protein source or egg-based protein source, or a mixture of such sources), and optionally at least one binder, a fat source, and/or flavoring ingredients. The meat alternative may be, for example, a legume based meat alternative, a rice based meat alternative, a soy based meat alternative, a pea based meat alternative, a gluten based meat alternative, a heme containing meat alternative, a mushroom based meat alternative, or any combination thereof. Some meat alternatives that can be included in a meat alternative composition do not contain heme (e.g., they contain no animal- or plant-derived heme), and may in some instances be referred to herein as a "non-heme-comprising meat alternative". The plant-based protein source may be for example, soy bean protein isolate or concentrate, pea protein isolate, rice protein, chickpeas, lentils, *spirulina*, *Quinoa*, mycoprotein (or other mushroom sources), chia seeds, hemp seeds, and/or brown rice flour, cranberry protein isolate, or any mixture thereof. Flavor ingredients can be added to the meat alternative composition to improve taste and odor of a meat alternative composition. Some exemplary flavor ingredients are caramelized onions, nutritional yeast, and seasoning blends. Binders can promote textures similar to animal-derived meat textures in a meat alternative. Some exemplary binders include methylcellulose, brown rice flour, and tapioca flour; however, other binders known in the art can be used. An exemplary fat source is coconut oil. Coconut oil is particularly useful in the compositions of the present invention due to its high saturated fatty acid composition. However, skilled practitioners will appreciate that other plant-based oils or mixtures of such oils can be used, such as those with high saturated fatty acids, including palm oil, canola oil, avocado oil, corn oil palm kernel oil, or any mixture thereof. Using fat sources with high saturation, such as coconut oil or others, can be useful in that they can provide visually a marbling effect in the meat alternative compositions, thereby mimicking the appearance of animal-derived meat.

Skilled practitioners will appreciate that a meat alternative can be produced, e.g., as described herein, or obtained from commercial sources. Exemplary commercially-available meat alternatives are widely available, examples of which are those available from Beyond Meat™, MorningStar Farms™, Gardein, Impossible™, Tofurky, Field Roast™, Yves Veggie Cuisine™, Nightlife™, Boca Burger™, Sweet Earth Natural Foods™, Impossible Foods™, and Simply Balanced™. Skilled practitioners will appreciate that commercially available meat alternatives can be replicated but with a cranberry seed preparation substituting for, or added to, the colorant used in the commercially available meat alternative.

A meat alternative composition further includes the cranberry seed composition. The cranberry seed composition can color the meat alternative composition so that the meat alternative composition better resembles the appearance of raw meat. The cranberry seed composition can alternatively or in addition increase the protein content of the meat alternative composition. Further, the cranberry seed composition can alternatively or in addition increase the fiber content of the meat alternative composition.

Cranberry Seed Preparations and Meat Alternative Compositions

As used herein, the term "cranberry seed preparation" refers to a preparation of cranberry seeds where the seeds have been processed to break or crush the seeds into smaller particle sizes, e.g., by grinding, mincing, cutting, flaking, grating, drying, blending, and/or pressing, the cranberry seeds.

The particles of processed cranberry seeds have an average particle size less than that whole cranberry seeds from which the preparation was prepared. For example, the cranberry seed particles can have an average particle size of about 0.5 micrometers ($\mu$m) to about 1 millimeter, e.g., an average particle size of about 1 $\mu$m to about 900 $\mu$m, e.g., about 100 $\mu$m to about 800 $\mu$m, about 400 $\mu$m to about 800 $\mu$m, about 700 $\mu$m to about 800 $\mu$m, about 1 $\mu$m to about 500 $\mu$m or about 750 $\mu$m. For example, a cranberry seed preparation may be a powdered cranberry seed preparation, a granular cranberry seed preparation, a flaked cranberry seed preparation, or a mixture thereof.

Skilled practitioners will appreciate that a cranberry seed preparations, such as cranberry seed powder, can be produced, e.g., by grinding and/or crushing cranberry seeds, e.g., into a powder, using any method known in the art. Alternatively or in addition, cranberry seed preparations, e.g., cranberry seed powders, are commercially available.

Cranberry seed powders may be a large particle powder, a fine powder, or an ultrafine powder. A large particle powder is known in the art as a powder with particle sizes greater than 20 $\mu$m. A fine particle powder is known in the art as a powder with particle sizes less than 20 $\mu$m and greater than 1 $\mu$m. An ultrafine particle powder is known in the art as a powder with particle sizes of 1 $\mu$m or less. Exemplary cranberry seed powders that are commercially available include "Cran d'Or Cranberry Seed Dry Extract-40 Mesh", "Cran d'Or Cranberry Seed Dry Extract-60 Mesh", "Cran Naturelle Organic Cranberry Seed Dry Extract-60 Mesh", "Cran Naturelle Organic Cranberry Seed Dry Extract-60 Mesh", "Cranberry Seed Protein Powder 100%" made by Federal Ingredients, and "Cranberry Seed Powder" made by BNK Enterprises (20 mesh). Federal Ingredient's "Cranberry Seed Protein Powder 100%" is an example of granular cranberry seed preparation. The cranberry seed powder may alternatively between 18 mesh and 400 mesh, for example 20 mesh, 40 mesh, 60 mesh, 80 mesh, 100 mesh, 120 mesh, 140 mesh, 170 mesh, 200 mesh, 230 mesh, 270 mesh, 325 mesh, or 400 mesh.

In some instances, for example where a commercial cranberry seed powder is used, it may be useful to further process the cranberry seed powder. For example, the cranberry seed powder can be processed to further reduce the particle size, e.g., to about 10 $\mu$m to about 40 $\mu$m, e.g., using a pin mill. After reducing the particle size, the particles may be air classified within a range of 5 $\mu$m. The particles may be separated into a range of 30-35 $\mu$m and 36-40 $\mu$m for later use. Alternatively or in addition, a sieve or an air vortex may separate the reduced particles.

Cranberry seed preparations have a protein content that can increase the total protein content of the meat alternative composition. In some instances, about 40% of the protein content of the meat alternative composition is provided by the cranberry seed preparation. In others, the cranberry seed preparation provides at least 35%, 30%, 25%, 20%, 15%, 10%, or at least 5% of the total protein content. In some instances, the cranberry seed preparation provides up to 80% of the total protein content. In some instances, the protein content of the cranberry seed preparation may provide a large portion, or essentially all, of the meat alternative composition protein content. Some cranberry seed preparations useful in the present invention provide a protein content of about 1.1 to about 4.9 per gram of dry weight of the total meat alternative composition.

In some instances, a cranberry seed preparation can include ingredients in addition to processed cranberry seeds. For example, a cranberry seed preparation can further include a protein isolate, such as a pea protein isolate or a cranberry protein isolate or egg protein isolate, or any type of protein isolate mixtures. The protein isolate can in some instances increase the protein content of the cranberry seed preparation without increasing the level of insoluble fiber. High levels of insoluble fiber can for at least some consumers be difficult to digest and can lead to gastrointestinal distress. Some cranberry seed preparations useful in the present invention have an insoluble fiber content of about 2.3 g to about 10.8 g per gram of dry weight of the total meat alternative composition.

A protein isolate is generally a compound having a protein concentration of at least 90%. A pea protein isolate is a compound derived from a pea that has a protein content of at least 90%. A cranberry protein isolate is a compound with a protein content of at least 90%, derived from any part of the cranberry (e.g., cranberry seed, skin, leaves, or other cranberry plant material). A protein concentrate is known in the art as a compound having a protein content of about 70% to about 90%. Protein concentrates, for example pea protein concentrates or cranberry protein concentrates, may be included as ingredients in a meat alternative composition, or any other formulation described herein.

In some instances, it can be useful to include a cranberry protein isolate in compositions described herein, such as in a cranberry seed preparation, to increase the protein concentration. To obtain a cranberry protein isolate useful in the compositions and methods described herein, some cranberry powders can be processed using isoelectric precipitation to extract cranberry protein from the cranberry powder. First, the cranberry proteins are solubized. The commercially available cranberry powder is dissolved in warm water, around 20° C. to about 50° C. at an elevated pH, for example a pH of about 9 to about 12. The water and cranberry powder is then filtered through a filter having a size range of about 0.1 µm to about 1 µm. The filtered solution is precipitated at a temperature of about 2° C. to about 20° C. and at an isoelectric point of a protein, for example a pH of about 4 to about 6. The cranberry protein isolate may then be added to a composition described herein.

In another method of making a cranberry protein isolate, a cranberry powder can undergo chromatography to extract cranberry protein isolate. For example, a commercially available cranberry powder can be dissolved in warm water, e.g., at a temperature of around 20° C. to about 50° C., at an elevated pH, for example at a pH of about 9 to about 12, to solubize the cranberry proteins. The water and cranberry powder can then be filtered through a filter having a size range of about 0.1 µm to about 1 µm. The solution is passed through a column to adhere protein fractions to the column. The column can be rinsed to collect the cranberry protein fractions, thus preparing a volume of cranberry protein isolate. The cranberry protein isolate may then be added to a composition described herein. Some cranberry protein isolates can be texturized.

In some instances, a cranberry seed preparation is added to the meat alternative to increase the protein content of the meat alternative composition. The cranberry seed preparation itself can be a protein source. Thus, the protein source in a meat alternative composition can, in some instances, be a cranberry seed powder, a cranberry protein isolate, or both a cranberry seed powder and a cranberry protein isolate. Cranberry seed preparations that do not contain cranberry protein isolate may in some instances serve as a both a source of protein and a source of fiber to the meat alternative composition.

Figure 1:
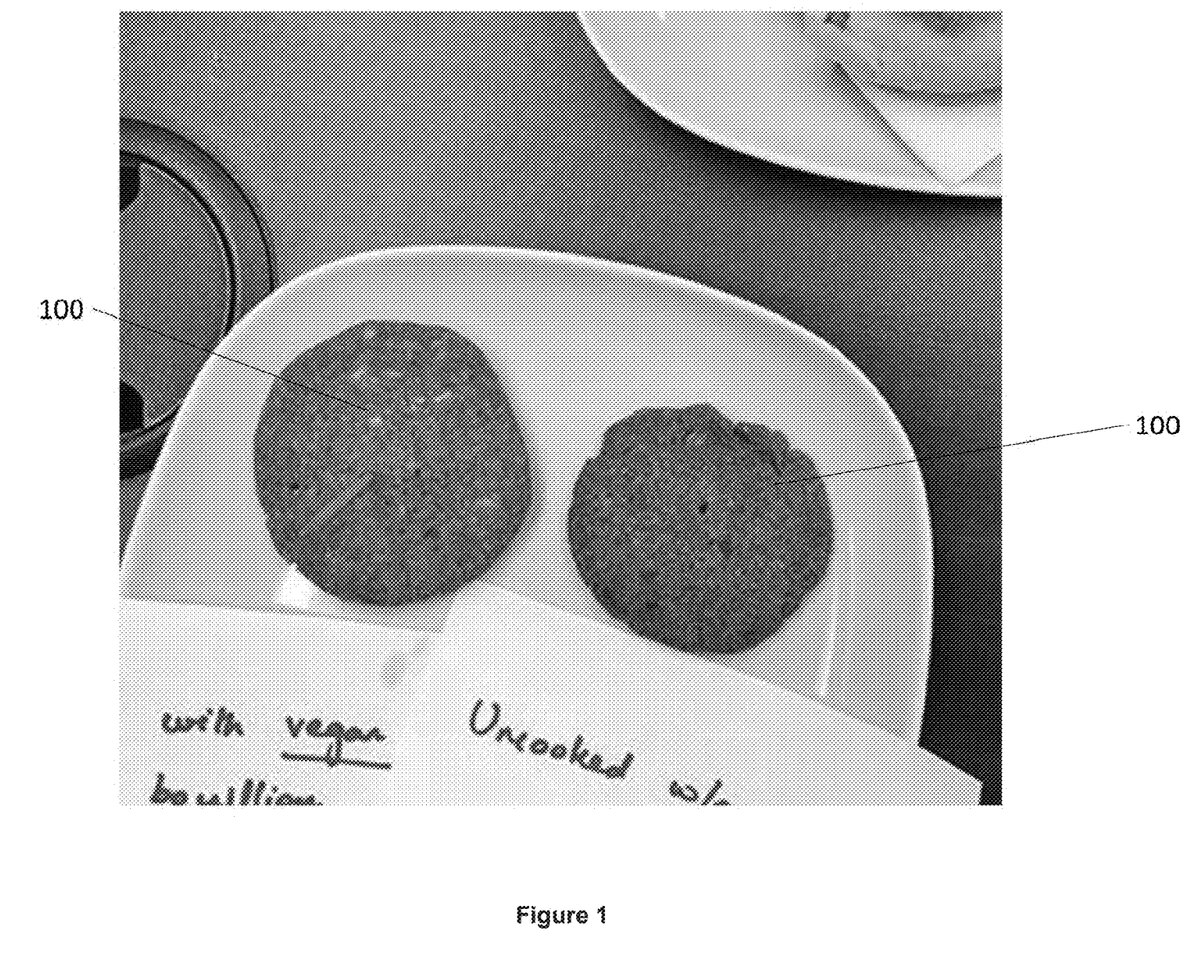
FIG. 1 is a view of two raw patties of the meat alternative composition, each of which have a roughly pink color, similar to that uncooked animal-derived meat.
Figure 2:
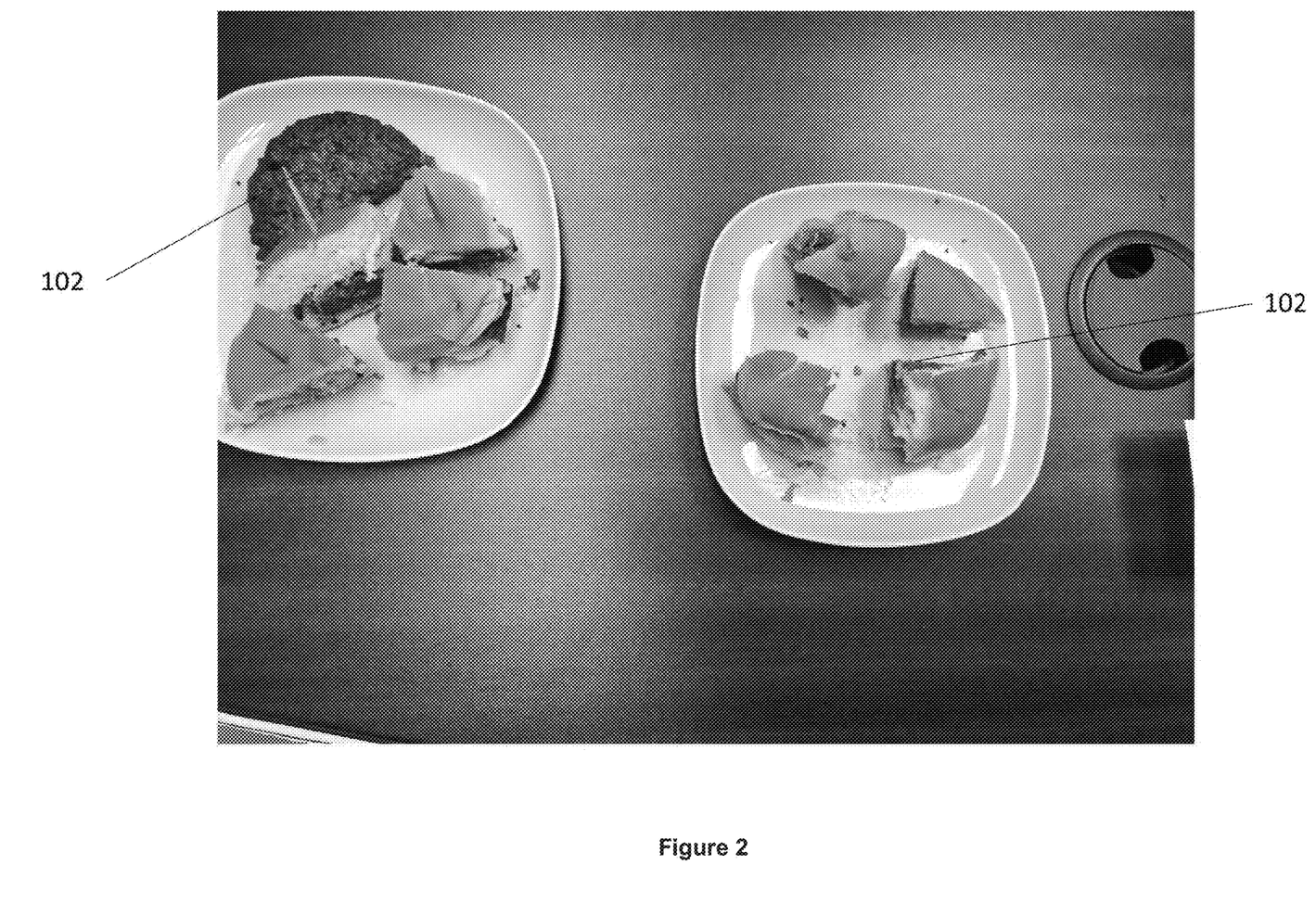
FIG. 2 is a view of cooked patties of the meat alternative composition, each of which have roughly brown color, similar to that cooked animal-derived meat.

FIGS. 1 and 2 illustrate an advantage of meat alternative compositions described herein. FIG. 1 shows a top view of uncooked meat alternative composition patties 100. The patties 100 are pink, similar to that raw ground beef, and are disc shaped. The meat alternative composition patties 100 are aesthetically similar to raw uncooked burger patties. The raw meat alternative composition patties 100 were grilled as if a traditional animal-derived meat burger patty. In some embodiments, the meat alternative composition is baked, broiled, sautéed or cooked in any other way used to cook meat. While grilling, the anthocyanins present in the meat alterative composition exhibited a color change. The color change was a shift from pink or red hues to brown, as shown in FIG. 2. FIG. 2 shows cooked meat alternative composition patties 102. The patties 102 are browned, aesthetically similar to cooked beef burger patties.

Some cranberry seed preparations comprise anthocyanin. As described above and illustrated in the Figures, anthocyanin has a red or pink color that at least partially colors raw meat alternative. Anthocyanin transitions from the red color to a brown color when heated, thereby at least partially coloring heated meat alternative composition. In some instances, it could be useful to add extra anthocyanin concentrate to the cranberry seed composition and/or the meat alternative composition to increase the anthocyanin content of the meat alternative composition, and enhance the color effect. Anthocyanins useful for adding to cranberry seed compositions, meat alternatives, and/or meat alternative compositions described herein may be derived, for example, from cranberries or any other anthocyanin-containing fruit.

Preparation and Packaging of Meat Alternative Products

An exemplary method of preparing and heating the meat alternative composition is described herein. A variety of plant based proteins and flavor ingredients can be combined to produce a meat alternative. The cranberry seed preparation can be added to the meat alternative in any fashion known in the art and at any stage of creation of the meat alternative composition. The cranberry seed preparation can be added such that the final meat alternative composition has a cranberry seed preparation content of at least about 1%. In some instances, the cranberry seed preparation can be added to the meat alternative in amounts sufficient to constitute at least about 5% of the meat alternative composition by weight. The anthocyanin content of the cranberry seed preparation provides a red or pink color. The cranberry seed preparation colors the meat alternative composition pink or red, depending amount of cranberry seed composition and/or amount of anthocyanin present in the cranberry seed preparation. A cranberry seed preparation content of about 1% to about 10% in the meat alternative composition produces a pink meat alternative composition. A cranberry seed composition content of about 10% to about 40% in the meat alternative composition produces a deeper pink or red meat alternative composition.

The meat alternative composition can be packaged and shipped for use in a restaurant or kitchen. The user then opens the packaging and removes the meat alternative composition. Alternatively, a meat alternative and a cranberry seed preparation can be packaged separately. In that instance, the user can then open the packaging of the meat alternative and the cranberry seed preparation, and mix the two accordingly, to prepare the meat alternative composition prior to cooking. In some cases, the meat alternative composition is cooked directly after preparation. The meat alternative composition can be heated alone or with other ingredients under conditions sufficient to cause a color change in anthocyanins present in the cranberry seed preparation, thus producing a meat alternative composition dish. In some instances meat alternative compositions can be seasoned before and/or after heating in accordance with a formulation. For example, a burger formulation may include the meat alternative composition, salt, pepper, diced onions, and Worcestershire sauce mixed together. The user then shapes discs from the meat alternative to cook on a grill, as shown in FIG. 1. The discs of meat alternative composition can be placed on the grill or other heated surface to cook. The thermal energy from the grill causes a color change in the anthocyanins present in the cranberry seed preparation present in the meat alternative composition. The anthocyanin turns from an initial pink or red color to a brown color. The disc be cooked such that it turns brown on the edges, but like meat, may maintain a pink center. An exemplary final burger product made from the meat alternative composition is shown in FIG. 2.

The coloring of the meat alternative composition may be adjusted to imitate different meats based on the amount of cranberry seed preparation (e.g., powder) present in the meat alternative composition. Meat alternative compositions imitating light pink meats, for example pork products, veal products, or chicken products, can have a cranberry seed preparation content of between 0.5% and 10%, inclusive. Meat alternative compositions imitating dark red meats, for example beef products or venison products, can have a cranberry seed preparation content of between 10% and 40%, inclusive. Ground turkey has a slight pink tinge, therefore a formulation for a meat alternative composition imitating ground turkey may call for 5% cranberry seed preparation content. Skilled practitioners will appreciate that the cranberry seed preparation content can be adjusted as needed.

In some instances, meat alternative compositions and/or cranberry seed preparations can further include anthocyanins from fruits other than cranberries, e.g., beets, strawberries, raspberries, pomegranates, or red onions, among others.

In some instances, a meat alternative composition can be combined with at least some animal-derived meat. The cranberry seed preparation can in such compositions increase the protein content and/or color the composition pink or red. Such compositions may include animal-derived at about 0.1% to about 99%, e.g., about 1% to about 33%, about 1% to about 25%, about 1% to about 10%, about 20% to about 70%, about 1% to about 5%, or about 0.1% to about 2%, by weight of the total composition.

While meat alternative compositions have been described, the cranberry seed preparation may also be used in other compositions or consumable products. The cranberry seed preparation can increase the fiber content and the protein content of the consumable products. In some instances, the cranberry seed preparation may be used as a natural colorant for the consumable products.

EXAMPLES

Meat Alternative Composition 1

An example of a method for preparing a meat alternative composition is described herein. In this exemplary meat alternative composition, the ingredients include vegetable broth, ground chickpeas, cranberry seed preparation, diced jack fruit, brown rice flour, tapioca flour, dried shitake mushroom, caramelizes amino, a seasoning blend, and coconut oil. The meat alternative composition 1 imitates ground meat (e.g., ground beef, pork, chicken, and bison) and can be shaped into a patty as shown in FIGS. 1 and 2. The meat alternative composition can have a vegetable broth content of about 30% to about 40%. The meat alternative composition can have a ground chickpea content of about 20% to about 25%. The meat alternative composition can have a diced jack fruit content of about 5% to about 10%. The meat alternative composition can have a cranberry seed preparation content of about 5% to about 18%. The meat alternative composition can have a brown rice flour content of about 0.1% to about 7%. The meat alternative composition can have a tapioca flour content of about 0.1% to about 7%. The meat alternative composition can have a coconut oil content of about 0.1% to about 5%. The ingredients and portions are also outlined in Table 1.

TABLE 1

| Ingredient | % of Ingredient in the Meat Alternative Composition | % of Protein of the Meat Alternative Composition Contributed by Each Ingredient |
| --- | --- | --- |
| Vegetable broth | 35.57% | 24.35% |
| Ground Chickpeas | 23.72% | 18.33% |
| Cranberry Seed Preparation | 11.86% | 44.84% |
| Diced Jack Fruit | 7.91% | 2.16% |
| Brown Rice Flour | 3.95% | 4.47% |
| Tapioca Flour | 3.95% | 0% |
| Dried Shiitake Mushroom | 3.95% | 5.85% |
| Caramelized Onions | 3.95% | 0% |
| Seasoning Blend | 3.16% | 0% |
| Coconut Oil | 1.98% | 0% |
| Total | 100.00% | 100% |

This exemplary mixture will be described as a 1000 gram mixture to simplify the mathematics, however the mixture can be prepared at any other weight or volume. To prepare 1000 grams (g) of meat alternative composition, 355.7 g of vegetable broth is mixed with 237.2 g of ground chickpeas to create a wet mixture. The wet mixture is then mixed with 79.1 g of diced jack fruit 39.5 g of brown rice flour, 39.5 g of tapioca flour, 39.5 g of dried shitake mushrooms, and 1.98 g of coconut oil. The resultant mixture is fibrous and meat like. Next, 39.5 g of caramelized onions and 39.5 g of the seasoning blend are added to flavor the meat alternative. At any point in the preparation, 118.6 g of cranberry seed preparation is added to the meat alternative mixture to color the mixture and provide increased protein content. In the meat alternative composition, at least 40% of the protein content is provided by the cranberry seed composition. The mixture may be divided into units, each with a protein content of at least 10 g of protein per meat alternative.

Table 1 shows the approximate percent of each ingredient present in the meat alternative composition by weight. Table 1 also shows the percent of protein in this meat alternative composition contributed by each ingredient. The cranberry seed preparation is about 11.86% of the total weight of the meat alternative composition and provides about 44.84% of the total protein content. In some formulations, the cranberry seed preparation provides at least 40% of the total protein content.

Meat Alternative Composition 2

An example of a formulation for preparing a meat alternative composition is described herein. In this exemplary meat alternative composition, the ingredients include vegetable stock, coconut oil, texturized pea protein, cranberry seed preparation, water, potato starch, nutritional yeast flakes, methylcellulose (high viscosity), spices (e.g., salt, shiitake powder, garlic powder, black pepper), and natural beef flavoring (e.g., natural flavor beef (type 274735), beef natural flavor (type f27339), fc beef flavor type natural (wxp001620001)). The meat alternative composition changes color upon the application of thermal energy from a red or pink to light or dark brown, imitating the color change observed in meat. The cranberry preparation is a natural colorant that facilitates the transition of the meat alternative composition from red or pink to brown. The meat alternative composition 2 imitates ground meat (e.g., ground beef, pork, chicken, and bison) and can be shaped into a patty as shown in FIGS. 1 and 2.

The meat alternative composition has a vegetable stock content of about 46% to about 78%. The meat alternative composition has a coconut oil content of about 7% to about 25%. The meat alternative composition has a texturized pea protein content of about 0% to about 12%. In some cranberry seed preparations, the pea protein is part of the cranberry seed preparation. The meat alternative composition has a cranberry seed preparation content of about 6% to about 29%. The cranberry seed preparation can include cranberry seed powder and cranberry protein isolate. The meat alternative composition can have a water content of about 2% to about 5%. The meat alternative composition can have a potato starch content of about 1% to about 3%. The meat alternative composition can have a nutritional yeast flakes content of about 0% to about 2%. The meat alternative composition can have a methylcellulose (high viscosity) content of about 0.1% to about 3%. The meat alternative composition can have a salt content of about 0% to about 1%. The meat alternative composition can have a beef flavor content of about 0% to about 3%. The meat alternative composition can have a shiitake powder content of about 0% to about 1%. The meat alternative composition can have a black pepper content of about 0% to about 1%. The ingredients and portions are also outlined in Table 2.

TABLE 2

| Ingredient | Percent |
| --- | --- |
| Vegetable Stock | 62.06% |
| Coconut Oil, Melted | 10.53% |
| Texturized Pea Protein | 9.17% |
| Cranberry Seed Powder | 9.17% |
| Water | 3.51% |
| Potato Starch | 2.12% |
| Nutritional Yeast Flakes | 1.27% |
| Methylcellulose HV | 1.13% |
| Kosher Salt | 0.99% |
| Nat Flavor Beef Type (274735) | 0.60% |
| Shiitake Powder | 0.42% |
| Garlic Powder | 0.21% |
| Black Pepper | 0.21% |
| Beef Nat Flavor Type (F27339) | 0.20% |
| FC Beef Flavor Type Nat (WXP001620001) | 0.20% |
| Onion Powder | 0.14% |
| Methylcellulose HV | 0.07% |

Table 2 shows the approximate percent of each ingredient present in the meat alternative composition by weight of the total meat alternative composition. The cranberry seed preparation can be between about 6% and about 30%, inclusive, for example about 9.17%, of the total weight of the meat alternative composition. The ratio of cranberry seed powder to cranberry protein isolate can be about 4:3 to about 4:23, inclusive. In some formulations, the cranberry seed preparation provides at least 40% of the total protein content. In the Meat Alternative Composition 2, the cranberry seed preparation provides about 51% of the total protein content of the meat alternative composition.

To form the meat alternative, a user may first add the texturized protein to the liquid ingredients to hydrate the texturized proteins. The user may add the dry ingredients to the liquid ingredients, excluding the coconut oil (or any fat rich ingredient) and mix the ingredients together. The coconut oil may be melted and added.

To form, the meat alternative composition, the meat alternative may be mixed with the cranberry seed preparation. In some methods, the meat alternative composition is not homogeneous, but rather a partially mixed mixture so that the meat alternative composition imitates the muscle and fat deposit coloring of animal meat.

Meat Alternative Composition 3

An example of a formulation for preparing a meat alternative composition is described herein. In this exemplary meat alternative composition, the ingredients include vegetable stock, coconut oil, texturized pea protein, cranberry seed preparation, water, potato starch, nutritional yeast flakes, methylcellulose (high viscosity), and beef flavoring (e.g., natural flavor beef (type 274735), beef natural flavor (type f27339), fc beef flavor type natural (wxp001620001)), and a combination of spices (e.g., salt, shiitake powder, garlic powder, black pepper, and onion powder). The meat alternative composition changes color upon the application of thermal energy from a red or pink to light or dark brown, imitating the color change observed in meat. The cranberry seed preparation is a natural colorant that facilitates the transition of the meat alternative composition from red or pink to brown. The meat alternative composition 3 imitates ground meat (e.g., ground beef, pork, chicken, and bison) and can be shaped into a patty as shown in FIGS. 1 and 2.

The meat alternative composition can have a vegetable stock content of about 46% to about 78%. The meat alternative composition can have a cranberry seed preparation content of about 6% to about 28%. The cranberry seed preparation can include cranberry seed powder and cranberry protein isolate. The meat alternative composition can have a coconut oil content of about 7% to about 14%. The meat alternative composition can have a texturized pea protein content of about 0% to about 7%. In some cranberry seed preparations, the pea protein is part of the cranberry seed preparation. The meat alternative composition can have a water content of about 2% to about 5%. The meat alternative composition can have a potato starch content of about 1% to about 3%. The meat alternative composition can have a nutritional yeast flakes content of about 0% to about 2%. The meat alternative composition can have a methylcellulose (high viscosity) content of about 0.1% to about 3%. The meat alternative composition can have a salt content of about 0% to about 2%. The meat alternative composition can have a beef flavor content of about 0% to about 3%. The meat alternative composition can have a shiitake powder content of about 0% to about 1%. The meat alternative composition can have a black pepper content of about 0% to about 1%. The meat alternative composition can have an onion powder content of about 0% to about 1%. The ingredients and portions are also outlined in Table 3.

TABLE 3

| Ingredient | % of Ingredient in the Meat Alternative Composition |
| --- | --- |
| Vegetable Stock | 61.62% |
| Cranberry Seed Powder | 14.01% |
| Coconut Oil, Melted | 10.45% |
| Texturized Pea Protein | 4.90% |
| Water | 3.48% |
| Potato Starch | 2.10% |
| Nutritional Yeast Flakes | 1.26% |
| Methylcellulose | 1.19% |
| Kosher Salt | 0.99% |
| Shiitake Powder | 0.42% |
| Garlic Powder | 0.21% |
| Black Pepper | 0.21% |
| Beef Flavor | 1.00% |
| Onion Powder | 0.14% |

Table 3 shows the approximate percent of each ingredient present in the meat alternative composition by weight. The cranberry seed preparation can be between about 6% and about 28%, inclusive, for example about 14.01%, of the total weight of the meat alternative composition. The ratio of cranberry seed powder to cranberry protein isolate can be about 4:3 to about 4:23, inclusive. In some formulations, the cranberry seed preparation provides at least 40% of the total protein content. In the Meat Alternative Composition 3 the cranberry seed preparation provides about 25% of the total protein content of the meat alternative composition.

To form the meat alternative, a user may first add the texturized protein to the liquid ingredients to hydrate the texturized proteins. The user may add the dry ingredients to the liquid ingredients, excluding the coconut oil (or any fat rich ingredient) and may mix the ingredients together. The coconut oil may be melted and added.

To form the meat alternative composition, the meat alternative may be mixed with the cranberry seed preparation. In some methods, the meat alternative composition is not homogeneous, but rather a partially mixed mixture so that the meat alternative composition imitates the muscle and fat deposit coloring of animal meat.

Meat Alternative Composition 4

An example of a formulation for preparing a meat alternative composition is described herein. In this exemplary meat alternative composition, the ingredients include water, texturized pea protein, coconut oil, cranberry seed preparation, potato starch, methylcellulose (high viscosity), spices (e.g., salt, garlic powder, onion powder, yeast extract, black pepper, shiitake powder), and beef flavoring (e.g., natural flavor beef (type 274735), beef natural flavor (type f27339), fc beef flavor type natural (wxp001620001)). The meat alternative composition changes color upon the application of thermal energy from a red or pink to light or dark brown, imitating the color change observed in meat. The cranberry preparation is a natural colorant that facilitates the transition of the meat alternative composition from red or pink to brown.

The meat alternative composition can have a water content of about 43% to about 73%. The meat alternative composition can have a texturized pea protein content of about 0% to about 25%. In some cranberry seed preparations, the pea protein is part of the cranberry seed preparation. The meat alternative composition can have a coconut oil content of about 8% to about 15%. The meat alternative composition can have a cranberry seed preparation content of about 4% to about 42%. The cranberry seed preparation can include cranberry seed powder and cranberry protein isolate. The meat alternative composition can have a potato starch content of about 1% to about 3%. The meat alternative composition can have a methylcellulose content of about 1% to about 2%. The meat alternative composition can have a salt content of about 0% to about 2%. The meat alternative composition can have a garlic powder content of about 0% to about 1%. The meat alternative composition can have an onion powder content of about 0% to about 1%. The meat alternative composition can have a yeast extract content of about 0% to about 1%. The meat alternative composition can have a beef flavor content of about 0% to about 3%. The ingredients and portions are also outlined in Table 4.

TABLE 4

| Ingredient | % of Ingredient in the Meat Alternative Composition |
| --- | --- |
| Water | 57.93% |
| Texturized Pea Protein | 17.62% |
| Coconut oil | 11.75% |
| Cranberry Seed Preparation | 6.61% |
| Potato Starch | 1.76% |
| Methylcellulose | 1.41% |
| Kosher Salt | 0.99% |
| Nat Flavor Beef Type (274735) | 0.53% |
| Garlic Powder | 0.33% |
| Onion Powder | 0.33% |
| Black Pepper | 0.26% |
| Beef natural Flavor Type (F27339) | 0.18% |
| FC Beef Flavor Type natural (WXP001620001) | 0.18% |
| Yeast Extract | 0.11% |
| Shiitake Powder | 0.11% |

Table 4 shows the approximate percent of each ingredient present in the meat alternative composition by weight. The cranberry seed preparation can be between about 4% and about 42%, inclusive, for example about 6.61%, of the total weight of the meat alternative composition. The ratio of cranberry seed powder to cranberry protein isolate can be about 4:3 to about 4:23, inclusive. In some formulations, the cranberry seed preparation provides at least 40% of the total protein content. In the Meat Alternative Composition 4, the cranberry seed preparation and protein pea isolate provides about 18 grams of protein per serving of the meat alternative composition.

To form the meat alternative, a user may first add the texturized protein to the liquid ingredients to hydrate the texturized proteins. The user may add the dry ingredients to the liquid ingredients, excluding the coconut oil (or any fat rich ingredient) and mixes the ingredients together. The coconut oil may be melted and added.

To form the meat alternative composition, the meat alternative may be mixed with the cranberry seed preparation. In some methods, the meat alternative composition is not homogeneous, but rather a partially mixed mixture so that the meat alternative composition imitates the muscle and fat deposit coloring of animal meat.

Meat Alternative Composition 5

An example of a formulation for preparing a meat alternative composition is described herein. In this exemplary meat alternative composition, the ingredients include water, coconut oil, texturized pea protein, dried and diced apple, sweetened and dried cranberries, cranberry seed preparation, methylcellulose (high viscosity) cranberry concentrate, potato starch, spices (e.g., salt, garlic powder, onion powder, yeast extract, black pepper, mushroom powder, dry sage) and pork flavoring (e.g., natural Pork Sausage flavoring (Type 725389), and Pork Fried Flavor (Type NAT 111280)). The meat alternative composition changes color upon the application of thermal energy from a red or pink to light or dark brown, imitating the color change observed in meat. The cranberry preparation is a natural colorant that facilitates the transition of the meat alternative composition from red or pink to brown.

The meat alternative composition can have a water content of about 41% to about 69%. The meat alternative composition can have a coconut oil content of about 9% to about 16%. The meat alternative composition can have a texturized pea protein content of about 0% to about 9%. In some cranberry seed preparations, the pea protein is part of the cranberry seed preparation. The meat alternative composition can have a cranberry seed preparation content of about 4% to about 22%. The cranberry seed preparation can include cranberry seed powder and cranberry protein isolate. The meat alternative composition can have a cranberry concentrate content of about 0% to about 2%. The meat alternative composition can have a potato starch content of about 1% to about 2%. The meat alternative composition can have a methylcellulose content of about 1% to about 2%. The meat alternative composition can have a salt content of about 0% to about 2%. The meat alternative composition can have a garlic powder content of about 0% to about 1%. The meat alternative composition can have an onion powder content of about 0% to about 1%. The meat alternative composition can have a yeast extract content of about 0% to about 1%. The meat alternative composition can have a black pepper content of about 0% to about 1%. The meat alternative composition can have a mushroom powder content of about 0% to about 1%. The meat alternative composition can have a dry sage content of about 0% to about 1%. The meat alternative composition can have a pork flavoring content of about 0% to about 2%. The ingredients and portions are also outlined in Table 5.

TABLE 5

| Ingredient | % of Ingredient in the Meat Alternative Composition |
| --- | --- |
| Water | 55.00% |
| Coconut Oil | 12.22% |
| Texturized Pea Protein | 6.62% |
| Dried apple, diced | 6.62% |
| sweetened dried cranberries, diced | 6.62% |
| Cranberry Seed Preparation | 6.62% |
| Potato Starch | 1.53% |
| Methylcellulose | 1.22% |
| Cranberry Concentrate | 1.02% |
| Kosher Salt | 0.81% |
| Garlic Powder | 0.42% |
| Onion Powder | 0.34% |
| Black Pepper | 0.28% |
| Dry Sage | 0.17% |
| NAT Pork Sausage Type 725389 | 0.10% |
| Pork Fried Flavor Type NAT 111280 | 0.10% |

Table 5 shows the approximate percent of each ingredient present in the meat alternative composition by weight. The cranberry seed preparation can be between about 4% and about 42%, inclusive, for example about 6.62%, of the total weight of the meat alternative composition. The ratio of cranberry seed powder to cranberry protein isolate can be about 4:3 to about 4:23, inclusive. In some formulations, the cranberry seed preparation provides at least 40% of the total protein content.

To form the meat alternative, a user may add the texturized protein to the liquid ingredients to hydrate the texturized proteins. The user may add the dry ingredients to the liquid ingredients, excluding the coconut oil (or any fat rich ingredient) and may mix the ingredients together. The coconut oil may be melted and added.

To form, the meat alternative composition, the meat alternative may be mixed with the cranberry seed preparation. In some methods, the meat alternative composition is not homogeneous, but rather a partially mixed mixture so that the meat alternative composition imitates the muscle and fat deposit coloring of animal meat.

Meat Alternative Composition 6

An example of a formulation for preparing a meat alternative composition is described herein. The meat alternative composition 6 forms a jerky composition that imitates an animal-derived meat, for example beef jerky, pork jerky, bison jerky, or lamb jerky. The jerky composition may be shaped into flat strips and prepared to have a tough, chewy consistency. The jerky composition, once formed, can be mixed with nuts, fruits, and chocolates to form a trail mix composition. The trail mix composition can include the jerky composition and walnuts, cashews, almonds, cranberries, plum pieces, pear pieces, apple pieces, cranberry seeds, peach pieces, coconut flakes, chocolate pieces, ginger pieces, and/or pecan pieces.

In this exemplary meat alternative composition, the ingredients include water, cranberry seed preparation, cane sugar, soy sauce, yeast extract, onion powder, garlic powder, other spices, (e.g., salt, black pepper, mushroom powder, dry sage, smoke powder, celery juice powder, black pepper, mustard, cinnamon, rosemary, and ginger), white vinegar, canola oil, and natural flavoring (e.g., natural beef flavoring, natural pork flavoring, natural bison flavoring, natural lamb flavoring.)). The meat alternative composition changes color upon the application of thermal energy from a red or pink to light or dark brown, imitating the color change observed in meat. The cranberry preparation is a natural colorant that facilitates the transition of the meat alternative composition from red or pink to brown.). In some instances, the cranberry seed preparation may also be added to the meat alternative composition to increase a protein and/or fiber content of the meat alternative composition.

The ingredients and portions are also outlined in Table 6.

TABLE 6

| Ingredient | % of Ingredient in the Meat Composition |
| --- | --- |
| Water | 6-25% |
| Cranberry Seed Preparation | 4-45% |
| Cane Sugar | 4-30% |
| Soy Sauce | 1-10% |
| Yeast Extract | 0-2% |
| Onion Powder | 0-1% |
| Garlic Powder | 0-1% |
| Other Spices | 0-2% |
| White vinegar | 0-1% |
| Natural flavors | 0-1% |
| Canola Oil | 0-1% |

Table 6 shows the approximate percent range of each ingredient present in the meat alternative composition by weight. The cranberry seed preparation can be between about 4% and about 45%, inclusive, of the total weight of the meat alternative composition. The ratio of cranberry seed powder to cranberry protein isolate can be about 4:3 to about 4:23, inclusive. In some formulations, the cranberry seed preparation provides at least 40% of the total protein content.

To form the meat alternative, a user may add the texturized protein to the liquid ingredients to hydrate the texturized proteins. The user may add the dry ingredients to the liquid ingredients, excluding the canola oil (or any fat rich ingredient) and may mix the ingredients together.

To form the meat alternative composition, the meat alternative may be mixed with the cranberry seed preparation. In some methods, the meat alternative composition is not homogeneous, but rather a partially mixed mixture so that the meat alternative composition imitates the muscle and fat deposit coloring of animal meat.

What is claimed:

1. A meat alternative composition comprising:
    a plant based meat alternative comprising:
        a binder at about 0.1% to about 14% dry weight of the total meat alternative composition, and
        a fat source at about 0.1% to about 25% dry weight of the total meat alternative composition; and
    a cranberry seed preparation at about 4% to about 42% dry weight of the total meat alternative composition.

2. The meat alternative composition of claim 1, wherein the plant based meat alternative is a legume based meat alternative, a rice based meat alternative, a soy based meat alternative, a pea based meat alternative, a gluten based meat alternative, a mushroom based meat alternative, or any combination thereof.

3. The meat alternative composition of claim 1, wherein the cranberry seed preparation comprises cranberry seed powder.

4. The meat alternative composition of claim 3, wherein the cranberry seed powder has an average particle size of about 80 mesh.

5. The meat alternative composition of claim 3, wherein the cranberry seed preparation comprises a cranberry seed protein isolate.

6. The meat alternative composition of claim 1, wherein the cranberry seed preparation comprises cranberry seed powder and cranberry seed protein isolate at a ratio of between 4:3 and 4:23, inclusive.

7. The meat alternative composition of claim 1, wherein the cranberry seed preparation is about 2% to about 30% dry weight of the total meat alternative composition.

8. The meat alternative composition of claim 1, wherein the meat alternative composition comprises a plant based protein source at about 0.1% to about 25% dry weight of the total meat alternative composition.

9. The meat alternative composition of claim 1, wherein the fat source is about 8% to about 15% dry weight of the total meat alternative composition.

10. The meat alternative composition of claim 1, wherein at least 40% of the protein present in the meat alternative composition is provided by the cranberry seed preparation.

11. A method of preparing a meat alternative composition, comprising providing the meat alternative composition of claim 1, and heating the meat alternative composition under conditions sufficient to cause a color change in anthocyanins present in the cranberry seed preparation.

12. A meat alternative composition comprising:
    a non-heme-comprising meat alternative comprising:
        a binder at about 0.1% to about 14% dry weight of the total meat alternative composition;
        a fat source at about 0.1% to about 25% dry weight of the total meat alternative composition, and
        a plant based protein source at about 0.1% to about 25% dry weight of the total meat alternative composition; and
    a cranberry seed preparation at about 4% to about 42% dry weight of the total meat alternative composition.

13. The meat alternative composition of claim 12, wherein the non-heme-comprising meat alternative is a legume based meat alternative, a rice based meat alternative, a soy based meat alternative, a pea based meat alternative, a gluten based meat alternative, a mushroom based meat alternative, or any combination thereof.

14. The meat alternative composition of claim 12, wherein the cranberry seed preparation comprises cranberry seed powder.

15. The meat alternative composition of claim 14, wherein the cranberry seed powder has an average particle size of about 125 μm to about 225 μm.

16. The meat alternative composition of claim 12, wherein the cranberry seed preparation comprises cranberry seed protein isolate.

17. The meat alternative composition of claim 12, wherein the cranberry seed preparation comprises cranberry seed powder and cranberry seed protein isolate at a ratio between 4:3 and 4:23, inclusive.

18. The meat alternative composition of claim 12, wherein the cranberry seed preparation is about 6% to about 28% dry weight of the total meat alternative composition.

19. The meat alternative composition of claim 12, wherein the cranberry seed preparation comprises a cranberry seed protein concentrate.

20. A method of preparing a meat alternative composition, the method comprising:
    providing a meat alternative, and
    adding a cranberry seed preparation to the meat alternative, to thereby make a meat alternative composition, wherein the cranberry seed preparation is added to the meat alternative in amounts sufficient to constitute at least 5% of the meat alternative composition by weight.

21. The method of claim 20, wherein the cranberry seed preparation comprises a cranberry seed powder.

* * * * *